United States Patent
Huang

(10) Patent No.: US 10,914,972 B2
(45) Date of Patent: Feb. 9, 2021

(54) DETECTION DEVICE AND DETECTION METHOD FOR DETECTING CURVATURE OF DISPLAY PANEL

(71) Applicants: HKC Corporation Limited, Guangdong (CN); Chongqing HKC Optoelectronics Technology Co., Ltd., Chongqing (CN)

(72) Inventor: Junqin Huang, Guangdong (CN)

(73) Assignees: HKC Corporation Limited, Shenzhen (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 16/471,558

(22) PCT Filed: Sep. 1, 2017

(86) PCT No.: PCT/CN2017/100250
§ 371 (c)(1),
(2) Date: Jun. 19, 2019

(87) PCT Pub. No.: WO2018/120901
PCT Pub. Date: Jul. 5, 2018

(65) Prior Publication Data
US 2020/0004060 A1    Jan. 2, 2020

(30) Foreign Application Priority Data
Dec. 29, 2016    (CN) .......................... 2016 1 1250854

(51) Int. Cl.
*G02F 1/13*    (2006.01)
*G01N 21/95*    (2006.01)
(Continued)

(52) U.S. Cl.
CPC ....... *G02F 1/1309* (2013.01); *G01N 21/9515* (2013.01); *G02B 5/30* (2013.01); *G06F 3/0412* (2013.01); *G06F 2203/04102* (2013.01)

(58) Field of Classification Search
CPC .... G02F 1/1309; G01N 21/9515; G02B 5/30; G06F 3/0412; G06F 2203/04102; G01B 17/06; G01B 11/24; G01L 35/20
See application file for complete search history.

(56) References Cited

U.S. PATENT DOCUMENTS

| | | | |
|---|---|---|---|
| 2015/0022475 A1* | 1/2015 | Watanabe | G06F 1/1643 345/173 |
| 2016/0170245 A1* | 6/2016 | Zhang | G06F 1/1601 445/25 |

(Continued)

FOREIGN PATENT DOCUMENTS

CN    105509663 A    4/2016

OTHER PUBLICATIONS

International Search Report of PCT Patent Application No. PCT/CN2017/100250 dated Nov. 30, 2017.

*Primary Examiner* — Ryan W Sherwin

(57) ABSTRACT

The disclosure discloses a detection device and a detection method for detecting the curvature of a display panel, including a detection platform which carries and transfers the display panel; a distance sensor installed on the detection platform and detecting a first height value $H_1$ of the height between the end of the display panel and the distance sensor; and a controller which electrically connects the distance sensor, the controller includes a processor and a memory, the memory stores an executable instruction, the processor executes the executable instruction, the executable instruction includes sending the first height value $H_1$ to the controller, the controller compares the first height value $H_1$ with a reference height value $H_2$, and issues a warning if the (Continued)

difference value ΔH between the first height value $H_1$ and the reference height value $H_2$ is greater than a preset threshold value H.

8 Claims, 2 Drawing Sheets

(51) Int. Cl.
*G02B 5/30* (2006.01)
*G06F 3/041* (2006.01)

(56) References Cited

U.S. PATENT DOCUMENTS

2016/0299365 A1* 10/2016 Deng .................... G02F 1/1309
2017/0234680 A1* 8/2017 Long .................... G01B 11/306
　　　　　　　　　　　　　　　　　　　　　　　　250/338.1

* cited by examiner

DETECTION DEVICE AND DETECTION METHOD FOR DETECTING CURVATURE OF DISPLAY PANEL

FIELD

The disclosure relates to a detection device and a detection method for detecting the curvature of a display panel.

BACKGROUND

A polarizing plate of a display panel occurs to curl up at its end during manufacture. When the polarizing plate is attached to a liquid crystal substrate to form the display panel, the curled-up polarizing plate bends the end of the liquid crystal substrate. When the end of the assembled display panel is bent within a certain range, the display panel is still usable. However, when the display panel is bended to a too large degree, the display panel cannot meet the use requirement.

The method in prior art for detecting the curvature of a display panel generally employs manual detection, which is carried out by placing the display panel on a horizontal marble workbench and manually measuring. However, a display panel placed on a workbench is easily to be broken. And, the manual measurement process is complicated, requires relatively large quantity of manpower and is prone to skip detection.

SUMMARY

The disclosure provides a detection device, which aims at convenient and quick automatic detection of the curvature of an end of a display panel.

In order to achieve the above object, the present disclosure proposes a detection device, which is applied for detecting a display panel. The detection device includes:

a detection platform which carries and transfers a display panel;

a distance sensor which is installed in the detection platform and detects a first height value $H_1$ of the height between the end of the display panel and the distance sensor; and A controller, the distance sensor is electrically connected with the controller, the controller includes a processor and a memory, the memory stores executable instructions, the processor executes the executable instructions, the executable instructions include sending the first height value $H_1$ to the controller, the controller compares the first height value $H_1$ with a reference height value $H_2$, and issues a warning if the difference value $\Delta H$ between the first height value $H_1$ and the reference height value H2 is greater than a preset threshold H.

In an embodiment of the present disclosure, a range the preset threshold value h is: $0.5\ mm \leq H \leq 1\ mm$.

In an embodiment of the present disclosure, the distance sensor is an infrared sensor or an ultrasonic sensor.

In an embodiment of the present disclosure, the detection platform includes a mounting bracket and at least two spaced rollers mounted on the mounting bracket, and the distance sensor is mounted on the mounting bracket and is defined between the rollers.

In an embodiment of the present disclosure, a range the reference height value H2 is $15\ cm \leq H2 \leq 20\ cm$.

In an embodiment of the present disclosure, the detection device further includes a touch display, and the touch display is electrically connected with the controller.

The disclosure also provides a method for detecting the curvature of an end of a display panel, including the following operations:

transferring the display panel so that one end of the display panel abuts a distance sensor;

the distance sensor detecting a first height value $H_1$ of the height between the end of the display panel and the distance sensor, and sending the first height value $H_1$ to a controller;

the controller computing a difference value between the first height value $H_1$ and a reference height value $H_2$, and giving a warning if the difference value $\Delta H$ is greater than a preset threshold value H.

In an embodiment of the present disclosure, after the operation of detecting a first height value $H_1$ of the height between the end of the display panel and the distance sensor, the method further includes detecting a second height value of the central flat area of the display panel and sending the second height value to the controller, the second height value being recorded the reference height value $H_2$.

In an embodiment of the present disclosure, the method also includes transferring the display panel to a re-detecting section for re-detection.

The disclosure also provides a detection method of a display panel, including the following operations:

transferring the display panel so that one end of the display panel abuts a distance sensor;

the distance sensor detecting a first height value $H_1$ of the height between the end of the display panel and the distance sensor, and sending the first height value H1 to a controller;

the controller computing a difference value between the first height value $H_1$ and a reference height value $H_2$, and issuing a warning if the difference value $\Delta H$ is greater than a preset threshold value H, the reference height value H2 is a height value of the height between the central flat area of the display panel and the distance sensor, a range of the reference height value H2 is $15\ cm \leq H2 \leq 20\ cm$, and the distance sensor is an infrared sensor.

According to the technical scheme of the present disclosure, the display panel is carried and transferred by a detection platform, so that one end of the display panel abuts a distance sensor, and the distance sensor detects a first height value $H_1$ of the height between the end of the display panel and the distance sensor, the controller computes a difference value between the first height value $H_1$ and the reference height value H2, if the difference value $\Delta H$ is greater than a preset threshold value H, then the curvature of the end of the display panel is determined to be too large to meet use requirement, thereby the detection device issues a warning to warn the operator. In this way, the detection device may conveniently and quickly detect whether the curvature of the display panel meets the use requirement, reducing manual detection process and reducing labor cost.

BRIEF DESCRIPTION OF THE DRAWINGS

In order to more clearly explain the embodiments of the present disclosure or the technical solutions in the prior art, the drawings that need to be used in the embodiments or the description of the prior art will be briefly introduced below. obviously, the drawings in the following description are only some embodiments of the present disclosure, for those of ordinary skill in the art, other drawings can be obtained according to the structures shown in these drawings without paying creative labor.

Figure 1:
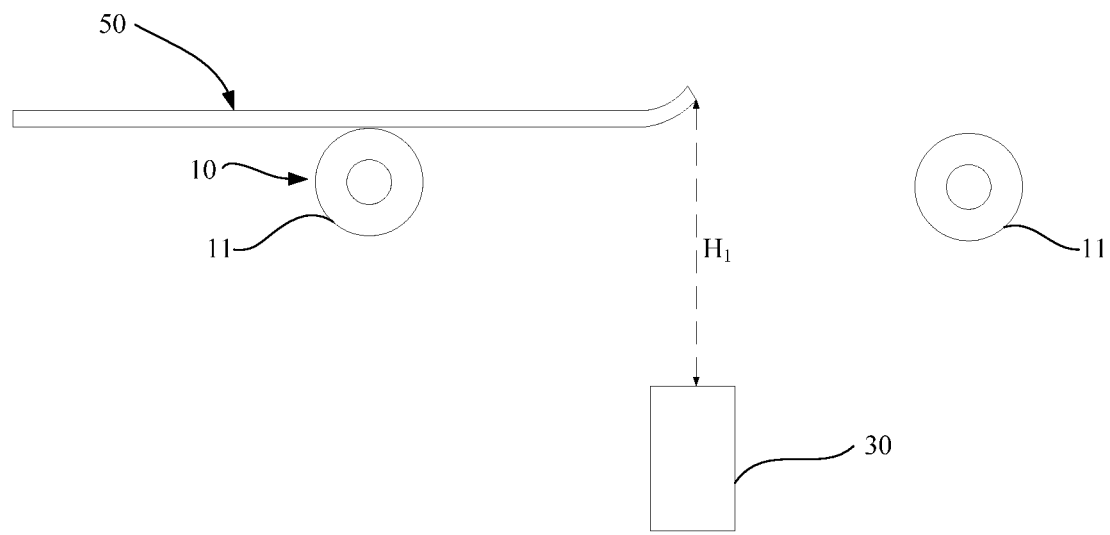
FIG. 1 is a structural diagram of a detection device which is detecting a first height value of an end of a display panel in an embodiment according to the present disclosure.

The realization, functional features and advantages of the purpose of this disclosure will be further described with reference to the accompanying drawings in conjunction with the embodiments.

DETAILED DESCRIPTION OF THE EMBODIMENTS

The technical solutions of the embodiments of the present disclosure will be clearly and completely described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

It should be noted that all directional indications (such as up, down, left, right, front, back, etc.) in the embodiments of the present disclosure are only set to explain the relative positional relationship, movement, etc. between the components in a certain posture (as shown in the drawings), and if the specific posture changes, the directional indication changes accordingly.

In this disclosure, unless otherwise expressly specified and defined, the terms "connect", "fix" and the like shall be understood in a broad sense, for example, "fix" may be a fixed connection, a detachable connection, or an integral body; It can be a mechanical connection or an electrical connection. It can be directly connected or indirectly connected through an intermediate medium. It can be the internal communication of two elements or the interaction relationship between two elements, unless otherwise explicitly defined. For those of ordinary skill in the art, the specific meaning of the above terms in this disclosure can be understood according to the specific circumstances.

In addition, in this disclosure, the descriptions such as "first" and "second" are set for the purpose of description only, and are not to be understood as indicating or implying its relative importance or implicitly indicating the number of indicated technical features. Thus, features defining "first" and "second" may explicitly or implicitly include at least one the feature. In addition, the technical solutions between the various embodiments may be combined with each other, but must be based on what one of ordinary skill in the art can achieve. When the combination of technical solutions is contradictory or impossible to achieve, it should be considered that the combination of such technical solutions does not exist and is not within the scope of protection required by this disclosure.

The present disclosure proposes a detection device 100 for detecting a display panel 50, the display panel 50 may be a liquid crystal display panel, such as a TN panel or IPS panel, a LCD display panel, an OLED display panel, a QLED display panel, a curved display panel or other display panel, etc.

Figure 2:
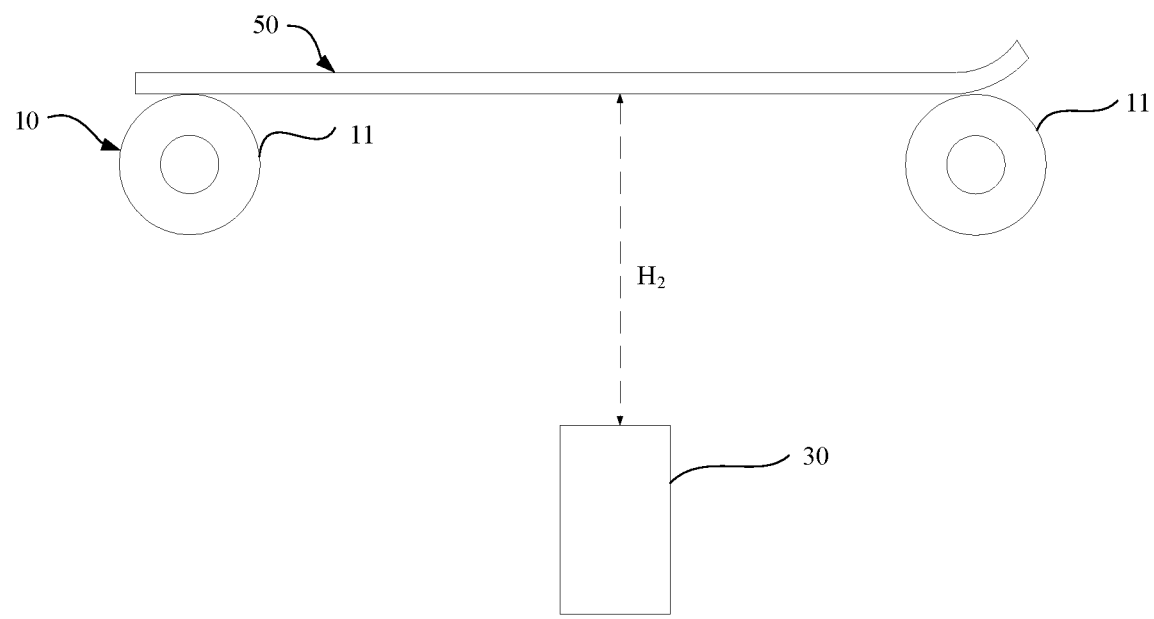
FIG. 2 is a structural diagram of a detection device which is detecting a second height value of the central panel of a display panel in an embodiment according to the present disclosure.

Referring to FIGS. 1 and 2, in an embodiment of the present disclosure, the detection device 100 includes:

a detection platform 10 that carries and transfers the display panel 50;

a distance sensor 30 mounted on the detection platform 10 and detecting a first height value $H_1$ of the height between the end of the display panel 50 and the distance sensor 30; as well as a controller 70, the distance sensor 30 is electrically connected with the controller 70, the controller 70 includes a processor 71 and a memory 73, the memory 73 stores an executable instruction, the processor 71 executes the executable instruction, the executable instruction includes: sending the first height value $H_1$ to the controller 70, the controller 70 compares the first height value $H_1$ with the reference height value H2, and issues a warning if the difference value $\Delta H$ between the first height value $H_1$ and the reference height value $H_2$ is greater than a preset threshold value H.

The reference height value H2 is the height value of the height between the central flat area (the area without warpage) of the display panel 50 and the distance sensor 30, and may be measured in advance or be detected during detection.

According to the technical scheme of the present disclosure, a display panel 50 is carried and transferred by a detection platform 10, so that one end of the display panel 50 abuts a distance sensor 30, and then the distance sensor 30 detects a first height value $H_1$ of the height between the end of the display panel 50 and the distance sensor 30, and a controller 70 computes a difference value between the first height value $H_1$ and the reference height value $H_2$. if the difference value $\Delta H$ between the first height value $H_1$ and the reference height value $H_2$ is greater than a preset threshold value H, then the curvature of the end of the display panel is determined to be too large to meet use requirement, thereby the detection device 100 issues a warning to warn the operator. In this way, the detection device 100 may conveniently and quickly detect whether the bending degree of the display panel 50 meets the use requirement, reducing the manual detection process, and the labor cost.

In an embodiment, a range of the preset threshold value H is: 0.5 mm≤H≤1 mm. The preset threshold value H is set according to the size of the display panel 50, a large-sized display panel 50 allows the height value of its warpage to be higher, and a small-sized display panel 50 allows the height value of its warpage to be lower. All sizes of the display panels 50 in prior art are taken into account, and the allowable warpage height value thereof is 0.5 mm to 1 mm.

In an embodiment, the distance sensor 30 is an infrared sensor or an ultrasonic sensor. The infrared sensor measures distance by emitting infrared rays, and the ultrasonic sensor measures distance by emitting ultrasonic waves. Of course, other sensors may also be included and are also within the scope of protection of this disclosure.

Referring to FIGS. 1 and 2, in an embodiment of the present disclosure, the detection platform 10 includes a mounting bracket and at least two spaced rollers 11 mounted on the mounting bracket (not shown), and the distance sensor 30 is mounted in the mounting bracket and located between the rollers 11. The upper sides of the two rollers 11 are in the same horizontal plane, and the motor may drive the rollers 11 to rotate, thereby driving the transferring of the display panel 50. By defining the distance sensor 30 between the two rollers 11 and under the display panel 50, detection may be facilitated.

Further, a range of the reference height value H2 is 15 cm≤H2≤20 cm. That is, the height of the distance sensor 30 relative to the central flat area of the display panel 50 is 15 cm to 20 cm. When the distance sensor 30 in the mounting bracket is too close to the central flat area of the display panel 50, the mounting space may be affected, when the distance sensor 30 in the mounting bracket is too far away from the central flat area of the display panel 50, the sensitivity of detection may be affected. Therefore, the installation space and detection sensitivity may be insured when the height of the distance sensor 30 relative to the central flat area of the display panel 50 is set at 15 cm to 20 cm.

In this embodiment, the detection device 100 also includes a warning (not shown) that sends a warning message or a warning sound, and the alarm is electrically connected with the controller 70.

The warning sent by the alarm can be either a text warning message or a warning sound, so that the operator may be noticed that the panel does not meet the use requirements by the warning message or the warning sound, and the operator then proceeds with the next operation.

Figure 4:
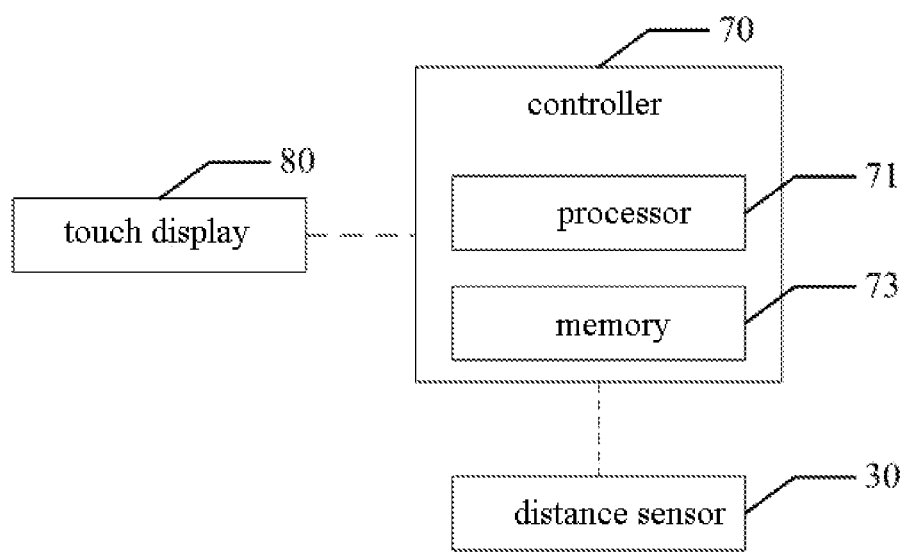
FIG. 4 is a schematic diagram of blocks of a detection device in an embodiment according to the present disclosure.

Referring to FIG. 4, in this embodiment, the detection device 100 also includes a touch display 80, which is electrically connected with the controller 70. The touch display 80 realizes touch operations such as inputting a preset threshold value H, operating the detection device 100 to start or stop, etc., and the touch display 80 may also display the detection data of the display panel 50.

Figure 3:
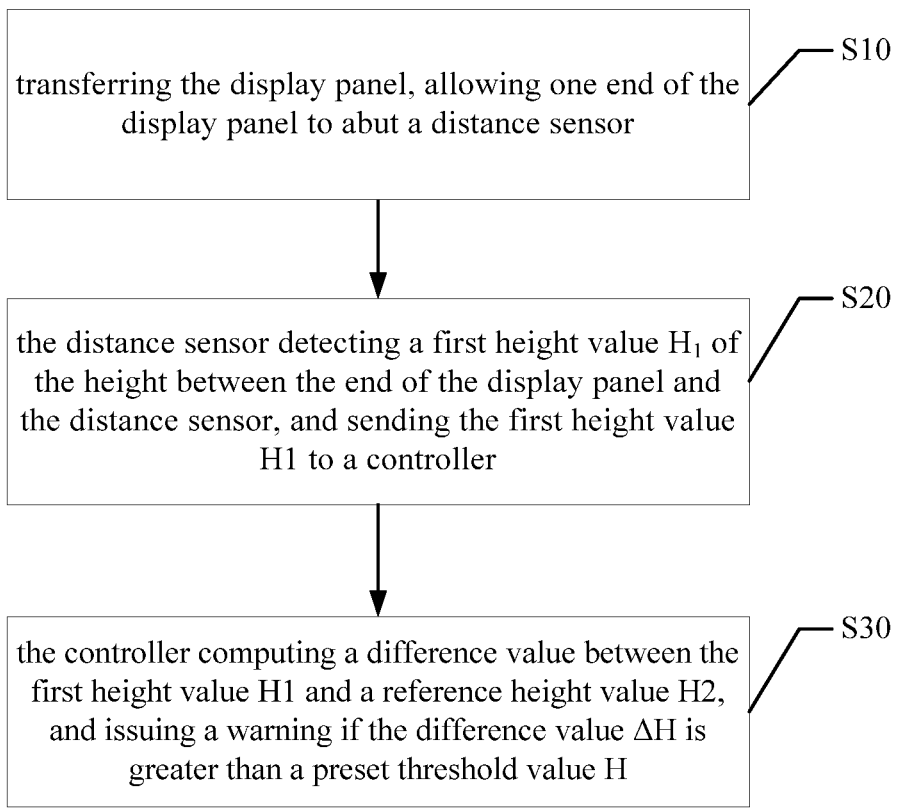
FIG. 3 is a flowchart of a method for detecting the curvature of a display panel in an embodiment according to the present disclosure.

Referring to FIG. 3, the disclosure also provides a detection method of a display panel:

Operation S10: transferring the display panel 50 so that one end of the display panel 50 abuts a distance sensor 30;

Operation S20: the distance sensor 30 detecting a first height value $H_1$ of the height between the end of the display panel 50 and the distance sensor 30, and sending the first height value $H_1$ to a controller 70;

Operation S30: the controller 70 computing a difference value between the first height value $H_1$ and a reference height value $H_2$, and issuing a warning if the difference value $\Delta H$ is greater than a preset threshold value H.

According to this method, the display panel 50 is carried and transferred by the detection platform 10, so that one end of the display panel 50 abuts the distance sensor 30, and then the distance sensor 30 detects a first height value $H_1$ of the height between the end of the display panel 50 and the distance sensor 30, and the controller 70 makes a difference between the first height value $H_1$ and the reference height value H2. if the difference $\Delta H$ between the first height value $H_1$ and the reference height value H2 is greater than the preset threshold h, it is proved that the bending of the end of the display panel 50 is too high to meet the use requirement, and the detection device 100 issues a warning to the operator. In this way, the detection device 100 may conveniently and quickly detect whether the bending degree of the display panel 50 meets the use requirement, reducing the manual detection process, and the labor cost.

In this embodiment, after the operation of detecting a first height value $H_1$ of the height between the end of the display panel 50 and the distance sensor 30, the method further includes detecting a second height value of the central flat area of the display panel 50 and sending the second height value to the controller 70, the second height value being recorded the reference height value H2.

That is, it is not necessary to manually input the reference height value H2, and the second height value may be recorded as the reference height value H2 by detecting the second height value of the height between the central flat area of the display panel 50 and the distance sensor 30.

Further, after the operation of issuing a warning, the method also includes sending the display panel 50 to a re-detecting section for re-detection. That is, by re-detecting the display panel 50 which is bent to a degree that exceeds the preset threshold value H, false detection may be avoided.

In an embodiment of the present disclosure, before the operation of transferring the display panel 50, the method also includes inputting a preset threshold value H to a controller 70 via the touch display. That is, a preset threshold value H is input in advance, and a range of the preset threshold value H is 0.5 mm≤H≤1 mm. The preset threshold value H is set according to the size of the display panel 50, a large-sized display panel 50 allows the height value of its warpage to be higher, and a small-sized display panel 50 allows the height value of its warpage to be lower. All sizes of the display panels 50 in prior art are taken into account, and the allowable warpage height value thereof is 0.5 mm to 1 mm.

The above is only the preferred embodiment of the present disclosure and is not therefore limiting the scope of the patent disclosure. Any equivalent structural change made under the inventive concept of the present disclosure using the contents of the present disclosure specification and drawings, or directly/indirectly applied in other related technical fields, is included in the scope of the patent protection of the present disclosure.

What is claimed is:

1. A detection device, applied for detecting a display panel, wherein the detection device comprises:
    a detection platform, carrying and transferring a display panel;
    a distance sensor which is installed in the detection platform and detects a first height value $H_1$ of the height between the end of the display panel and the distance sensor; and
    a controller, electrically connecting the distance sensor, the controller comprising a processor and a memory, wherein the memory stores an executable instruction, the processor executes the executable instruction, the executable instruction comprises: sending the first height value $H_1$ to the controller, the controller comparing the first height value $H_1$ with a reference height value $H_2$, and issuing a warning if the difference value $\Delta H$ between the first height value $H_1$ and the reference height value $H_2$ is greater than a preset threshold H, H is no less than 0.5 mm and no greater than 1 mm, $H_2$ is no less than 15 cm and no greater than 20 cm.

2. The detection device according to claim 1, wherein the distance sensor is an infrared sensor or an ultrasonic sensor.

3. The detection device according to claim 1, wherein the detection platform comprises a mounting bracket and at least two spaced rollers mounted in the mounting bracket, and the distance sensor is mounted on the mounting bracket and is defined between the rollers.

4. The detection device according to claim 1, wherein the detection device further comprises a touch display, the touch display electrically connects with the controller.

5. A method for detecting curvature of display panel, wherein the method comprises the following operations:
    transferring the display panel, allowing one end of the display panel to abut a distance sensor;
    the distance sensor detecting a first height value $H_1$ of the height between the end of the display panel and the distance sensor, and sending the first height value $H_1$ to a controller;

the controller computing a difference value between the first height value $H_1$ and a reference height value $H_2$, and issuing a warning if the difference value $\Delta H$ is greater than a preset threshold value H, H is no less than 0.5 mm and no greater than 1 mm, $H_2$ is no less than 15 cm and no greater than 20 cm.

6. The method according to claim 5, wherein after the operation of detecting a first height value $H_1$ of the height between the end of the display panel and the distance sensor, the method further comprises detecting a second height value of the central flat area of the display panel, sending the second height value to the controller, and the controller recording the second height value as the reference height value $H_2$.

7. The method according to claim 5, further comprising: transferring the display panel to a re-detecting section for re-detection.

8. A method for detecting display panel, comprising:
transferring the display panel, allowing one end of the display panel to abut a distance sensor;
the distance sensor detecting a first height value $H_1$ of the height between the end of the display panel and the distance sensor, and sending the first height value $H_1$ to a controller;
the controller computing a difference value between the first height value $H_1$ and a reference height value $H_2$, and issuing a warning if the difference value $\Delta H$ is greater than a preset threshold value H, H is no less than 0.5 mm and no greater than 1 mm,
the reference height value $H_2$ being a height value of the height between the central flat area of the display panel and the distance sensor, a range of the reference height value $H_2$, $H_2$ being no less than 15 cm and no greater than 20 cm, and the distance sensor being an infrared sensor.

* * * * *